US005452536A

United States Patent [19]
Chatten

[11] Patent Number: 5,452,536
[45] Date of Patent: * Sep. 26, 1995

[54] METHOD AND MECHANICAL APPARATUS FOR DETERRING BIRDS

[76] Inventor: Victor Chatten, 1567 W. 215th St., Torrance, Calif. 91501

[*] Notice: The portion of the term of this patent subsequent to Sep. 6, 2011 has been disclaimed.

[21] Appl. No.: 296,503

[22] Filed: Aug. 26, 1994

Related U.S. Application Data

[63] Continuation of Ser. No. 789,430, Nov. 5, 1991, Pat. No. 5,343,651, which is a continuation-in-part of Ser. No. 523,744, May 15, 1990, abandoned, which is a continuation-in-part of Ser. No. 475,215, Feb. 5, 1990, abandoned.

[51] Int. Cl.$^6$ .................................................... A01M 29/00
[52] U.S. Cl. .................................................................... 43/1
[58] Field of Search .................................. 43/1, 26.1, 61; 52/101; 115/22 A

[56] References Cited

U.S. PATENT DOCUMENTS 3,292,319  12/1966  McCarthy ................................. 52/101
4,074,653  2/1978  Pember ................................ 116/22 A
5,343,651  9/1994  Chatten ....................................... 43/1

*Primary Examiner*—Mark Rosenbaum
*Assistant Examiner*—Chuck Y. Mah
*Attorney, Agent, or Firm*—Lyon & Lyon

[57] ABSTRACT

An easy to assemble mechanical apparatus and methods that create a barrier for deterring birds from landing at or near undesirable perching locations. The barrier is created by a rotating carriage that is propelled in a rotational motion by the wind or an available draft of air. A first embodiment utilizes a rotatable carriage which is an assemblage of individual parts that form one unified rotating body which rotates on antifriction bearing surfaces with horizontally disposed rods extending radially outward therefrom. A second embodiment utilizes a pivot pin which supports the rotating carriage portion and is designed to be placed in a variety of locations by an easy-to-use locknut and groove system. A quick action push-nut, or other means for securing, secures the rods or means for creating a barrier onto the carriage. The carriage rotates about the pivot pin with a multiplicity of rods or a means for creating a barrier extending out to any desired length and at any angular disposition from the carriage.

6 Claims, 3 Drawing Sheets

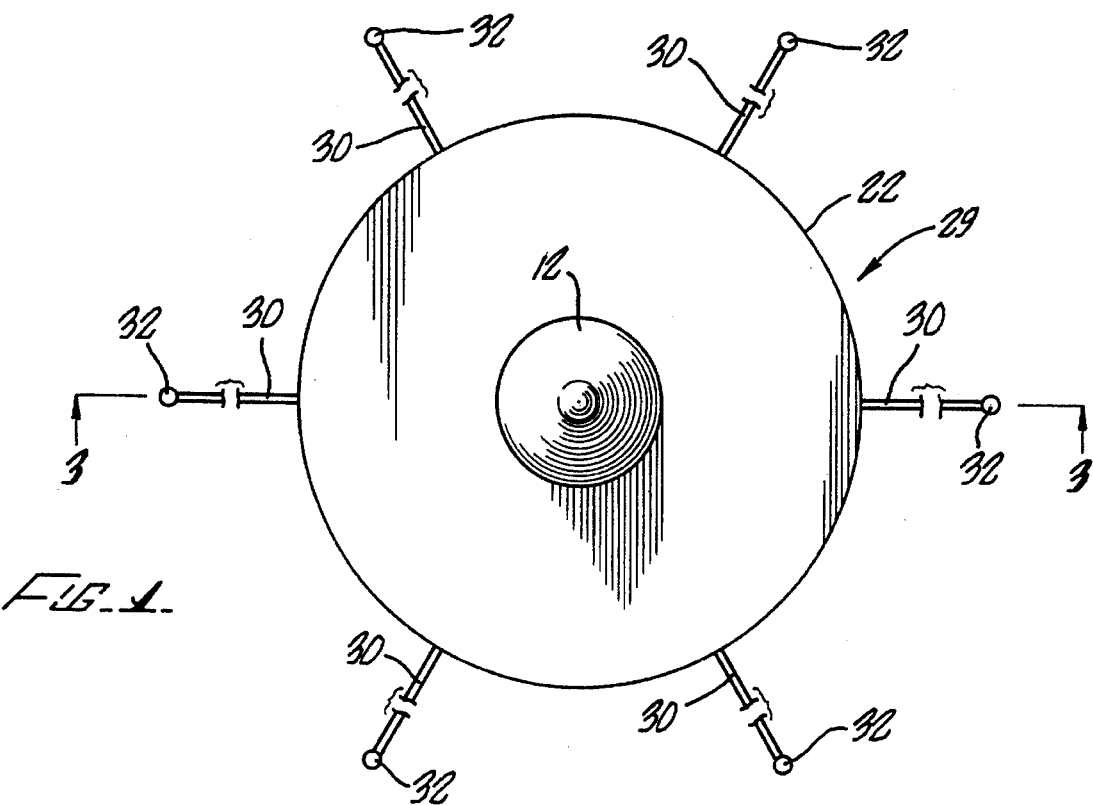
FIG_1.
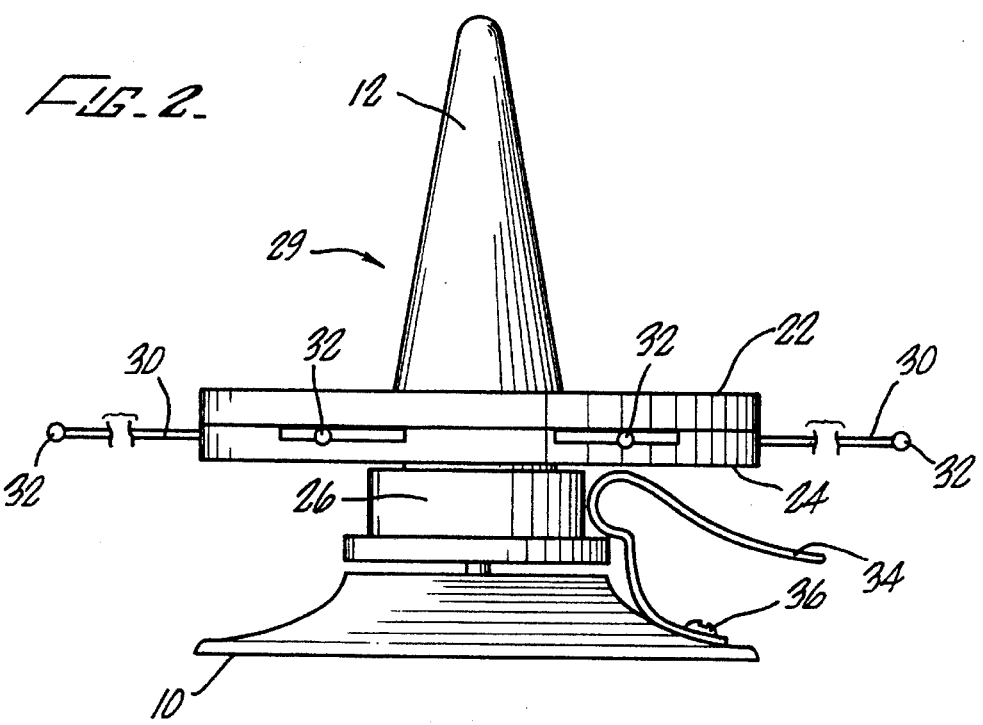
FIG_2.

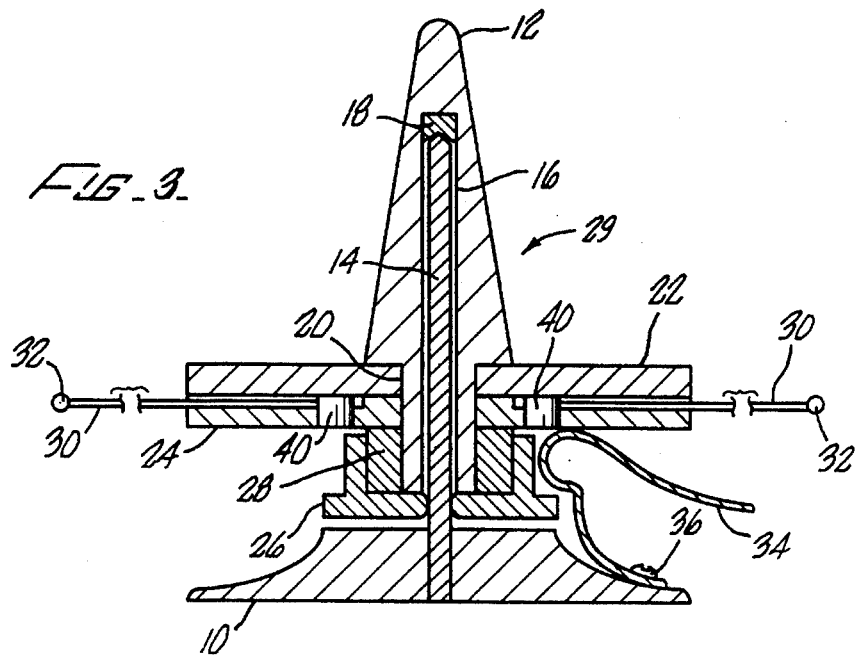
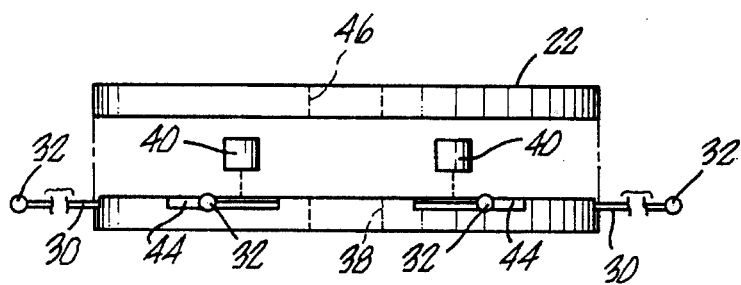
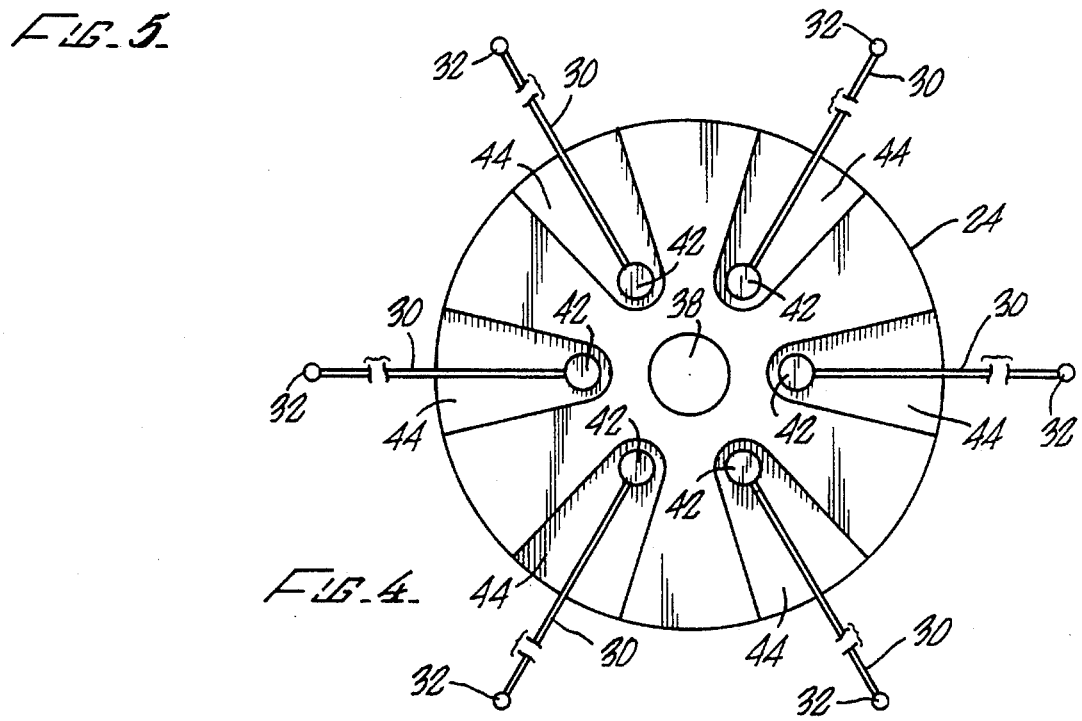

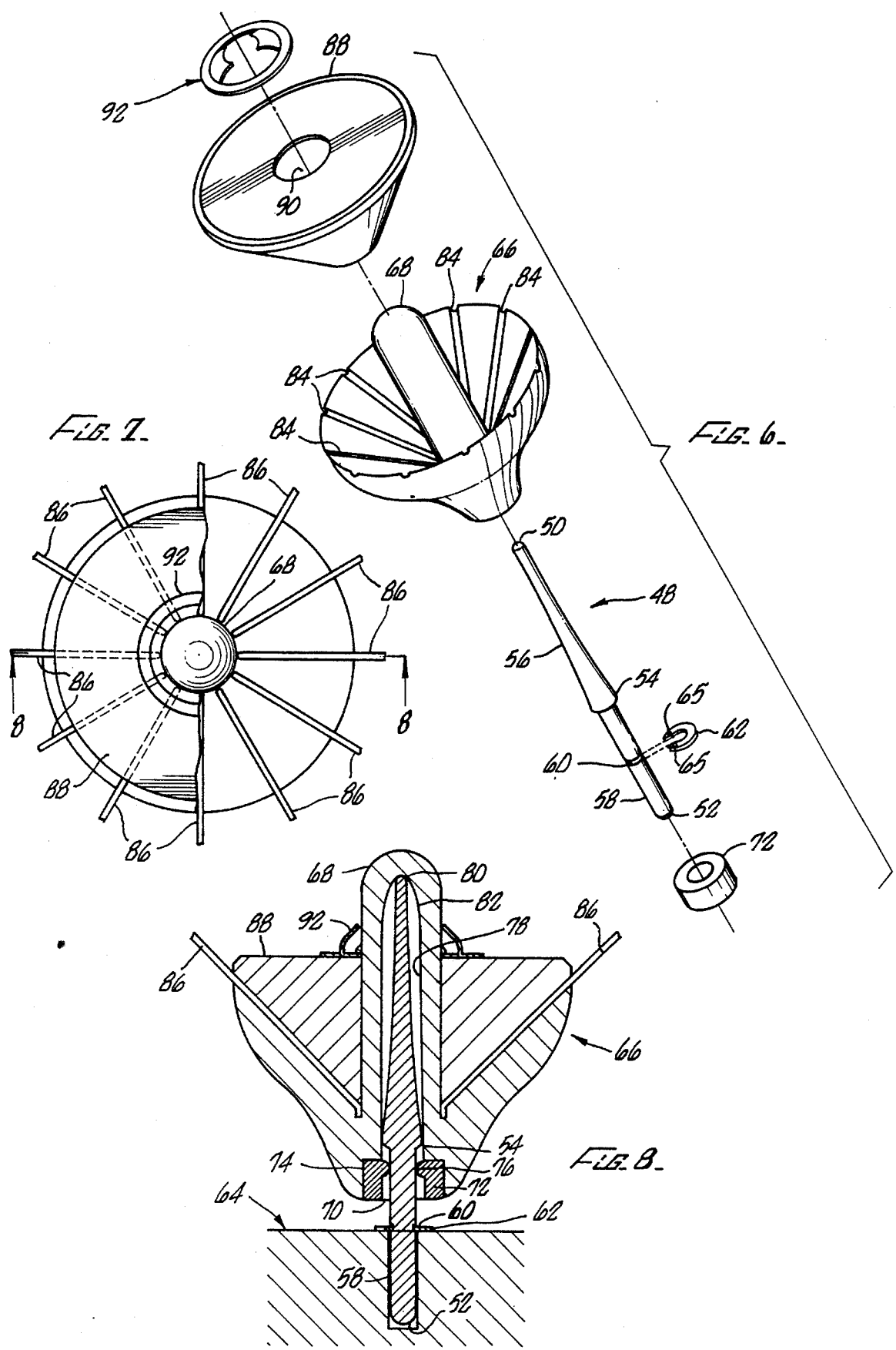

METHOD AND MECHANICAL APPARATUS FOR DETERRING BIRDS

RELATED APPLICATION DATA

This application is a continuation of application Ser. No. 07/789,430 filed Nov. 5, 1991 now U.S. Pat. No. 5,343,651 which is a continuation-in-part of application, Ser. No. 07/523,744 filed by the same applicant on May 15, 1990, entitled "METHODS AND MECHANICAL APPARATUS FOR DETERRING BIRDS," now abandoned, which is a continuation-in-part of another application, Ser. No. 07/475,215, filed by the same applicant on Feb. 5, 1990, entitled "MECHANICAL APPARATUS FOR DETERRING BIRDS," now abandoned.

BACKGROUND OF THE INVENTION

The field of the present invention is mechanical apparatus and methods for deterring birds from landing at undesirable perch locations.

Historically, birds have been a constant pest to all types of structures and activities of man. Particularly trouble-some are areas with large populations of swallows, seagulls, and pigeons. These unwelcome birds create unwanted noise and their droppings are an unsightly testimony to their presence on public structures and private residences. The bird droppings also present a threat to human health. Fungi in the bird droppings can transmit diseases to humans, with potentially fatal consequences to those suffering from diabetes, blood diseases or a respiratory disease.

Therefore, numerous methods and devices have been utilized to keep birds away from areas where the birds are known to roost and build their nests. Most methods have utilized inanimate devices comprised of a continuous metal strip with sharp, protruding spikes. These, however, must be accurately placed on the nesting area to be effective. The design of the metal strip itself is conductive to nest building by the more industrious of the pests, due to its general shape and immobility. Such devices are also injurious to the birds who impale their wings onto the sharp spikes and are potentially injurious to humans who unknowingly venture too close. Other inanimate devices include certain chemical gels that are applied to the nesting area and mock predators, but these have a limited life span, as the gel will eventually wear off and the mock predators will lose their deterrence effect over time. Reference is herein made to a patent application Ser. No. 07/557,411, filed by the same inventor on Jul. 23, 1990, entitled "BIRD DETERRENT METHOD AND DEVICE," which discloses a non-rotatable bird deterrent. That reference is hereby incorporated by reference herein.

The devices that are electrically powered have their drawbacks as well. A popular device is an electrified wire draped strategically around the nesting or perching area of the birds. These have been used at public buildings, but their high installation cost prohibits use at residences or smaller public facilities. Also, there is the constant cost of keeping the wires electrified and the potential for injury to humans.

Noise deterrent devices have been used but these also annoy the human occupants of the building or residence. Ultrasound emitters effectively deter birds but also household pets, such as cats and dogs, and thus are not real solutions. Another device emits an intermittent flash of light that is disruptive to the birds. This device is ineffective for exterior areas during daylight hours and requires constant upkeep.

Others have employed real life predators such as falcons to get rid of the bird pests. These are unreliable over the long run and do not address the problem of the offensive mess left by the predator itself. Still others have employed the particularly offensive method of shooting large numbers of the offending birds only to have others replace the killed pests.

A need has arisen for an efficient and reliable self-propelled mechanical device which can be utilized at public buildings and private residences, is easy to assemble, but is not injurious to the birds or offensive or injurious to humans.

SUMMARY OF THE INVENTION

The present invention pertains to mechanical apparatus and methods that reliably and efficiently deter birds from landing at undesirable perch locations. The disclosed apparatus and methods describe an efficient rotating barrier to bird perching when the outwardly extending rods or other deterrent means are propelled in a rotational motion by an available draft of air.

As assembled, a draft or wind current propels the rods and the carriage in a rotational motion about a pivot pin or cantilevered member. The rods are supported only at one end, and tend to flounce about like a tethered animal trying to escape the constant tension which is ever changing direction within the rods when influenced by the slightest draft or the close proximity of a bird in motion. The apparatus will remain in motion until terminated by a prolonged calm which will permit the rods to gradually eke out their own equilibrium and come to rest. This forms an impenetrable barrier to birds and also discourages their activity nearby.

In a first aspect, the present invention contemplates a supportive base which provides a stable support for an upper carriage assembly and provides a cantilevered member about which the carrier assembly concentrically rotates. The carriage assembly mates with the cantilevered member at two bearing locations made of antifriction material, permitting efficient rotation of the carriage assembly. The carriage assembly supports a number of rods that are attached to but removable from the carriages assembly. The rods radiate out from the axis of the carriage assembly in a horizontal plane. The user may easily select longer length rods to deter birds over larger areas.

In one aspect, the rods have small light-weight plug objects attached to the extreme ends of the rods to prevent injury to any humans who venture nearby while the apparatus is in operation.

In another aspect, a coil latch is attached to the base to engage the carriage when initially coupled to the base. The coil latch acts as a keeper during operation.

In a further aspect of the present invention, a carriage assembly composed of individual components, but which rotate as a unit, is described to permit quick replacement of rotating parts. A core is provided to house a bearing surface and mate with the cantilevered member. A rotation plate is abutted against the core and the horizontal rods are attached to the rotation plate. A second bearing surface is provided within the core or as a separate guide bearing. A locking collar secures the rotation plate and the guide bearing to the core so they rotate as a single unit.

A further aspect contemplates a cap plate and a base plate to provide attachment means for the radially outward extending rods. The horizontal rods are mechanically attached to the base plate at defined openings symmetrically positioned on the base plate. The cap plate covers the base plate to provide a smooth surface to minimize wind resistance during operation.

A further aspect contemplates the method of deterring birds using the apparatus as described above.

In a further aspect, the present invention contemplates a cylindrical pivot pin which provides support for the mechanical apparatus and provides a pivot about which the apparatus may rotate. The pin may be supported by any convenient base support with an appropriate opening. A rotatable carriage mates with the pivot pin along a concentric axis and contacts the pivot pin at an inner point within the carriage. A bearing, which is generally cylindrical in shape, is placed on the carriage and provides an antifriction surface for the pivot pin, thus allowing the carriage to rotate unhampered for a longer period of time. The carriage supports a number of rods of any convenient length which radiate outward from the carriage. These rods, drawn from spring tempered stainless steel or similarly rigid material, are positioned at any convenient angle in relation to the carriage, allowing the user added deterrence flexibility. The rods are placed into grooves machined onto the carriage and a retaining member secured by a pushnut is placed thereon, firmly positioning the rods within these grooves.

In another aspect, a modified pivot pin is utilized which is comprised of two rounded tips and a stepped portion therebetween. These qualities provide for smooth operation and long durability of the apparatus. A portion of the pivot pin is tapered from one end to the stepped portion, to permit unhampered rotation of the carriage during operation.

Another aspect contemplates a groove, notched in the pivot pin to accommodate a locknut of a convenient C-shape configuration. This allows greater utilization of the apparatus because a portion of the pivot pin adjacent to the locknut can be positioned within a large number of oversized openings. The locknut has two bores thereon which allows use of a standard instrument to remove the locknut from the apparatus.

Another aspect contemplates an inner surface within the central shaft of the carriage as being a substantially smoothed surface, providing for efficient rotational operation.

A further aspect utilizes a means for creating a barrier positioned on a rotatable carriage and held in place by a means for securing it thereon.

Another aspect describes the method of deterring birds using the apparatus with a pivot pin as described above.

Employing the foregoing features, the bird deterrent apparatus is easy to install, can be quickly repaired in the field and provides an efficient, economical bird deterrent. Accordingly, it is an object of the present invention to provide a mechanical apparatus and methods to deter birds from landing at undesirable perch locations. Other and further objects and advantages will appear hereafter.

BRIEF DESCRIPTION OF THE DRAWINGS

FIG. 1 is a plan view of a preferred embodiment of the present invention.

FIG. 2 is an elevation of a preferred embodiment.

FIG. 3 is a cross-sectional elevation view of the invention taken along line 3—3 of FIG. 1.

FIG. 4 is a plan view of the base plate in a preferred embodiment.

FIG. 5 is an elevation side view of the cap plate and base plate with phantom lines showing the assembled position.

FIG. 6 is an exploded view of another preferred embodiment of the present invention.

FIG. 7 is a top view of the invention, partially cutting away the push-nut.

FIG. 8 is a section view of the invention taken along line 8—8 of FIG. 7.

DETAILED DESCRIPTION OF THE PREFERRED EMBODIMENT

In a first embodiment, a supportive base 10, which can take on any convenient shape, is shown in FIG. 2 in its preferred shape of a generally circular cross-section. The lower portion of the base 10 has a larger diameter than the upper portion to increase stability during operation of the invention.

The core 12 is positioned above the supportive base 10. The core 12 is shown in its preferred conical shape in FIGS. 1 and 2. It is contiguous with the first support member 14. As shown in detail in FIG. 3, the core 12 concentrically engages the first support member 14 at the central opening 16. A bearing surface 18 is provided at an upper portion of the central opening 16. The bearing surface 18 provides a long lasting antifriction surface for continuous rotation of the apparatus and is made of appropriate antifriction material. A suitable antifriction material used for the different embodiments of the invention is a plastic material marketed under the brand name Delron.

The core 12 has a lower flange 20. The cap plate 22 is positioned on the flange 20 in a concentric manner. The cap plate 22 is circular in shape. Contiguous with the cap plate 22 is a base plate 24, also circular in shape and positioned on the lower flange 20 to rotate concentrically about the support member 14 as shown in FIG. 3. A lower bearing surface is provided by a guide bearing 26 positioned concentrically about the first support member 14 and is also made of appropriate antifriction material. The guide bearing 26 is a ring-shaped member. The locking collar 28 is also ring shaped and is located concentrically about the first support member 14 and positioned between the lower flange 20 and the guide bearing 26. The locking collar 28 interlocks the core 12, cap plate 22, base plate 24, and guide bearing 26 to form a carriage assembly 29 that rotates concentrically as a unit about the first support member 14.

A multiplicity of rods 30 radiate outward from and are horizontally disposed from the cap plate 22 and base plate 24. In a preferred embodiment, the rods 30 are stainless steel wires of sufficient gauge to permit rotation about the first support member 14 by wind or air reaction upon the rods 30 without excessive sagging of the rods 30 from their weight. The number of rods 30 can vary, but six of the rods 30 are shown in a preferred embodiment in FIGS. 1 and 4 and are placed at appropriate symmetrical locations around the base plate 24.

To prevent injury to unwary human visitors, each rod 30 is attached to a safety plug 32 made of lightweight material at the distal end of the rod 30. The safety plug 32 is generally spherical in shape and does not interfere with operation of the apparatus. When engaged, the core 12, the cap plate 22, the base plate 24 with the rods 30 and safety plugs 32, the guide bearing 26, and the locking collar 28 rotate in a unitary fashion about a concentric axis by wind or air current action against the rods 30 to deter bird perching. Larger areas of deterrence can be achieved by employing rods 30 that are longer in length.

A coil latch 34 is provided to initially engage the guide bearing 26 when the mechanical apparatus is initially assembled. The coil latch 34 is designed so as to not interfere with the rotation of the guide bearing 26 during operation of the apparatus. A mechanical connector 36 secures the coil latch 34 to the supportive base 10. This is shown in FIGS. 2 and 3.

FIG. 4 shows a plan view of the base plate 24 with the cap plate 22 removed. The base plate 24 engages the lower flange 20 through an opening 38. The cap plate also engages the lower flange 20 through an opening 46. The rods 30 are fixed to the base plate 22 by a rivet 40 mechanically secured at a port 42. The rods 30 sit in a grooved notch 44 on the base plate 24 which permits a flush mounting of the cap plate 22 onto the base plate 24. FIG. 5 illustrates the preferred method of mating the cap plate 22 onto the base plate 24.

In another preferred embodiment, a pivot pin 48 as shown in FIG. 6 is utilized to support the rotating apparatus. The pivot pin 48 employs a first rounded tip 50 to permit efficient rotation and a second rounded tip 52 which increases the durability of the pivot pin. Located therebetween is the stepped portion 54. This stepped portion 54 is formed by the different sized diameters of the tapered section 56 of the pivot pin 48 and the shank section 58 which is of a substantially uniform cylindrical cross-section. The shank section 58 extends from the stepped portion 54 to the second rounded tip 52 as shown in FIG. 6. The stepped portion 54 secures the pivot pin 48 to the rotating apparatus. Located on the shank section 58 is a groove 60. A locknut 62 is positioned on the groove 60 and provides a support for the apparatus at various base supports 64 that have an opening. The opening at the base support 64 may be of a wide range of sizes because the locknut 62 may be of a larger shape or size to accommodate larger openings. The locknut 62 is removed from the apparatus by inserting the ends of a standard needle-nosed pliers into the locknut bores 65 on the locknut 62 and opening the locknut 62, disengaging it from the groove 60.

A carriage 66 is positioned along a concentric axis with the pivot pin 48. The carriage 66 may take on any convenient shape but, as illustrated in FIGS. 6 and 8, a generally conical shape with a hub 68 is shown. A first aperture 70 of the carriage 66 engages the pivot pin 48. A bearing 72, generally cylindrical in shape, engages the carriage 66 and is placed thereon at a first diameter portion 74 of the first aperture 70. When in operation, the bearing 72 engages the pivot pin 48 along the shank section 58 near the stepped portion 54. A notched portion 76 located on the bearing 72 stabilizes the pivot pin 48 and allows efficient, stable rotation of the carriage 66. This assembled configuration is illustrated in FIG. 8.

The central shaft 78 extends from the first diameter portion 74 and ends at the inner point 80 within the hub 68 of the carriage 66. This inner point 80 is shown in FIG. 8 with a smoothed surface 82 to provide increased efficiency and durable operation of the apparatus should it wobble during rotation. The first rounded tip 50 of the pivot pin 48 abuts the inner point 80 and at certain times of high wind velocity, when the apparatus may wobble, the pivot pin 48 will contact the smoothed surface 82. Thus, during these times, a smooth, durable surface is provided.

Located on the carriage 66 are a multiplicity of recessed slots 84 as illustrated in FIG. 6. While the inventive means for creating a barrier may take on any convenient shape to conform to the recessed slots 84, in this preferred embodiment, a multiplicity of rods 86, of steel or other rigid material, are placed within these recessed slots 84. The rods 86 extend outward from the carriage 66 as illustrated in FIGS. 7 and 8. The rods 86 may project out from the carriage 66 to any desired length and at any desired angle and are symmetrically placed about the carriage 66 as shown in FIG. 7. A retaining member 88 which, as a means for securing, may take on any convenient shape, secures the rods 86 to the carriage 66. The retaining member 88 has a bore 90 which fits over the hub 68 of the carriage 66. A pushnut 92 fits onto the hub 68 and secures the retaining member 88 to the carriage 66.

Thus, a mechanical apparatus for deterring birds is disclosed. While embodiments and applications of the invention have been shown and utilized, it would be apparent to those skilled in the art that many more modifications are possible without departing from the inventive concepts herein. The invention therefore is not to be restricted except in the spirit of the appended claims.

What is claimed is:

1. A mechanical apparatus for deterring birds from landing at undesirable perch locations comprising:

a structurally supportive base having a first support member fixed onto said base;

a carriage assembly, axially adjoining and mating with said first support member at bearing surfaces provided therein;

a multiplicity of horizontally disposed rods, of stainless steel or rigid plastic or metal material, mechanically attached to said carriage assembly and projecting radially outward from said carriage assembly with said carriage assembly propelled in a rotational fashion about said first support member by air movement upon said rods.

2. The mechanical apparatus of claim 1 further comprising a multiplicity of safety plugs, one of said safety plugs being mechanically attached to the distal end of each horizontally disposed rod of said multiplicity of horizontally disposed rods.

3. A mechanical apparatus for deterring birds from landing at undesirable perch locations comprising:

a structurally supportive base having a first support member fixed onto said base;

a carriage assembly including, a core, said core having a central opening to axially adjoin and mate with said first support member at a bearing surface provided within said opening, a guide bearing, rotatably mounted about and contiguous with said first support member, a locking collar, contiguous with said core and said guide bearing, a base plate, rotatably mounted about and contiguous with said core and said locking collar; and a multiplicity of horizontally disposed rods, of stainless steel or rigid plastic or metal material, mechanically attached to said base plate and projecting radially outward from said base plate with said carriage assembly propelled in a rotational fashion about said first support member by air movement against said rods.

4. The mechanical apparatus of claim 3 further comprising a multiplicity of safety plugs, a safety plug being mechanically attached to the distal end of each horizontally disposed rod of said multiplicity of horizontally disposed rods.

5. A method for deterring birds from landing at undesirable perch locations, the method comprising the steps of:

mechanically attaching a multiplicity of horizontally disposed rods to a carriage assembly, said rods projecting radially outward;

attaching a safety plug to each rod with said safety plugs located at the distal end of said rods;

mounting said carriage assembly onto a base support, said carriage assembly and said base support mutually engaged along a concentric axis at appropriate bearing locations with the rotation of said carriage assembly effected by air movement upon said rods.

6. A mechanical apparatus for deterring birds from landing at undesirable perch locations comprising:

a pivot pin;

a carriage having a first aperture and a central shaft, said first aperture and said central shaft axially adjoining said pivot pin;

a bearing placed on said carriage within said first aperture and contiguous with said pivot pin;

a means for creating a barrier, positioned on said carriage and extending outward from said carriage and effecting rotation of said carriage by air movement against said means for creating a barrier to deter the alighting of birds; and a means for securing, positioned on said carriage to secure said means for creating a barrier to said carriage.

* * * * *